Oct. 4, 1960

R. M. SEIDEN 2,954,991

MECHANICAL COUPLING

Filed April 30, 1959

RICHARD M. SEIDEN
INVENTOR.

BY *Daniel H. Bobis*
*atty*

United States Patent Office 2,954,991
Patented Oct. 4, 1960

2,954,991

MECHANICAL COUPLING

Richard M. Seiden, Yonkers, N.Y., assignor to Worthington Corporation, Harrison, N.J., a corporation of Delaware Filed Apr. 30, 1959, Ser. No. 809,964

2 Claims. (Cl. 287—52.08)

This invention relates to an improved mechanical coupling for a lever or crank operatively mounted on the end of a rotatable spindle or shaft, and has for its principal objects the securement of said lever on said spindle in such a manner that the former is not easily slidably disengaged from the latter, and also that there is no relative rotation between the two.

To accomplish these and other objects, the rotatable spindle is provided with a slot in the end on which the lever is slidably mounted, and in the periphery of the hub of said lever another slot is provided, and use is made of a connecting member characterized in that it has two spaced legs or projecting portions integrally formed thereon, one of said projecting portions being inserted in the shaft slot causing radial expansion of said spindle within the lever hub to thereby prevent by a force fit accidental disengagement of said lever from the end of said spindle, and the other of said projecting portions fitting into the peripheral slot in said lever hub and thereby preventing relative rotation between said lever and said spindle.

The invention will be better understood when considered in connection with the accompanying specification and drawings forming a part thereof, in which.

Figure 1:
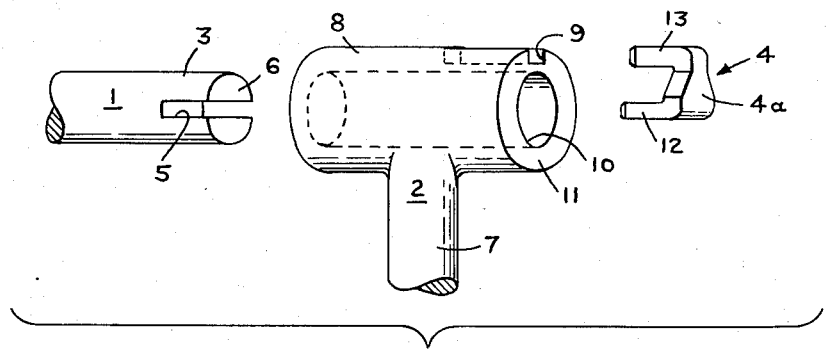
Figure 1 is an exploded view of the elements comprising one embodiment of the mechanical coupling of the present invention.

Referring to Figure 1, reference numeral 1 designates a spindle, or shaft, or some such mechanical element which is rotatably mounted in bearings or a similar type support (not shown). Reference numeral 2 designates a lever, or crank, or some such mechanical element, which when mounted on the end 3 of spindle 1, can be used to rotate or turn spindle 1. Reference numeral 4 designates one embodiment of a connecting member, functioning as will be more fully explained herein, to secure lever 2 on the end 3 of spindle 1 so that it is not easily slidably disengageable therefrom, which obviously is undesirable, and also to prevent relative rotation between the said lever 2 and said spindle 1, which defeats the purpose of having the lever 2 mounted on the spindle 1.

Figure 2:
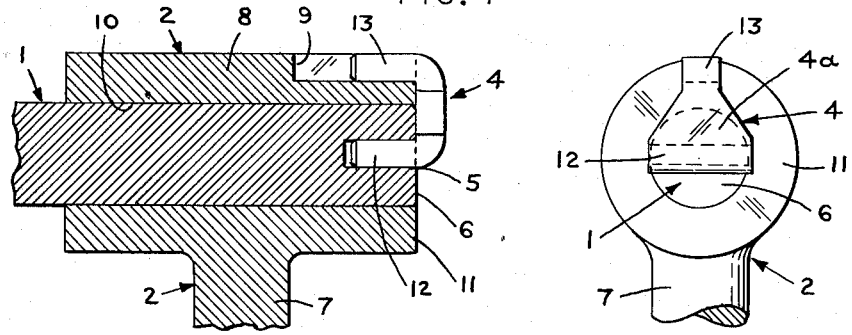
Figure 2 is a side sectional view of the elements of Figure 1, when assembled.
Figure 3:
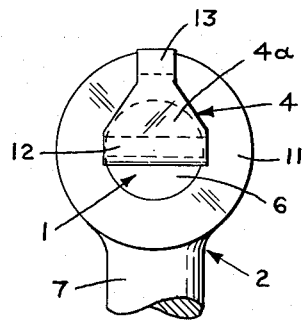
Figure 3 is an end view projected from Figure 2.

Referring now with particularity to structural features comprising the improved mechanical coupling of the present invention, as is clearly shown in Figures 1 and 2, in the end 3 of spindle 1 on which the lever 2 is operatively mounted, there is a slot 5 which extends transversely of the spindle end surface 6 and also inwardly from said end surface along the central longitudinal axis of the spindle. The lever 2, in addition to a handle 7, has a hub 8, which hub has a slot 9 machined in its periphery and also is provided with a central through bore or axial opening 10, into which the end 3 of spindle 1 is inserted in the assembly of the lever 2 on the spindle 1. More particularly, when properly assembled, the end surface 6 of spindle 1 is flush with the end surface 11 of the lever hub 8, and slot 9 in the periphery of the lever hub 8 lies in a plane parallel to the plane of slot 5 in the spindle 1. The fit of spindle 1 in the lever hub axial opening 10 is at this time a snug rather than a force fit, so that lever 2 can be rotated to place the slots 9 and 5 in their proper relationship as just described.

To complete the assembly, use is made of the connecting member 4, which member is substantially C-shaped in cross section and characterized in that it has spaced legs or projecting portions 12 and 13 integrally formed on, and adapted to extend laterally from opposite sides of a substantially trapezoidal-shaped body portion 4a. Projecting portion 12 is suitably sized so that when inserted in the slot 5 of the spindle 1 it causes radial expansion of the said spindle within the lever hub axial opening 10, and thereby intensifies the previously mentioned snug fit into a force fit. As a result, lever 2 cannot be accidentally slidably disengaged from its operative position on spindle 1.

To prevent relative rotation between the lever 2 and spindle 1, and in addition to the force fit which also contributes to this end, the projecting portion 13 of the connecting member 4 is adapted to fit into the lever hub peripheral slot 9 to thereby positively prevent this occurrence.

Figure 4:
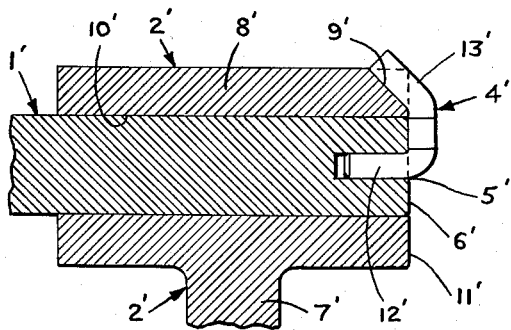
Figure 4 is a view similar to Figure 2, but of another embodiment of the invention.

In the embodiment of the invention shown in Figure 4, and in which similar parts are designated by the same but primed reference numerals, the lever hub peripheral slot 9' is inclined to the horizontal, thus taking advantage of the simplest machining operation by which this slot can be provided on the said hub, and the projecting portion 13' on connecting member 4', consistent with this change, is similarly inclined to the horizontal. Thus, in assembly, projecting portion 13' is adapted to fit into the modified lever hub peripheral slot 9', to thereby positively prevent relative rotation between the lever 2' and the spindle 1'. In all other respects, this embodiment of the invention is similar to the embodiment of Figures 1 and 2.

It will be understood that the invention is not to be limited to the specific construction or arrangement of parts shown, but that they may be widely modified within the invention defined by the claims.

What is claimed is:

1. A mechanical coupling for a spindle and a lever mounted on an end of said spindle comprising in combination, a spindle having a slot in one end thereof which slot extends transversely of the spindle end surface and inwardly therefrom along the central longitudinal axis of said spindle, a lever having a hub at one end which hub has a peripheral slot therein and also an axial opening therethrough for slidably mounting the lever on the end of said spindle having the slot therein, and a connecting member having spaced projecting portions integrally formed thereon, one of said projecting portions being inserted in the slot of the spindle causing radial expansion of said spindle within the axial opening of said lever hub and thereby preventing by a force fit sliding disengagement of said lever from the end of said spindle, and the other of said projecting portions fitting into the peripheral slot in said lever hub and thereby preventing relative rotation between said lever and said spindle.

2. The mechanical coupling as claimed in claim 1, in which the slot in the periphery of the lever hub is inclined to the horizontal, and the last named projecting portion on said connecting member is similarly inclined to the horizontal.

References Cited in the file of this patent

UNITED STATES PATENTS

| | | |
|---|---|---|
| 1,175,148 | Hyde | Mar. 4, 1916 |
| 1,185,810 | Linstromberg | June 6, 1916 |
| 2,098,515 | Pardieck | Nov. 9, 1937 |
| 2,153,919 | Forsythe | Apr. 11, 1939 |
| 2,253,831 | Wantz | Aug. 26, 1941 |

FOREIGN PATENTS

| | | |
|---|---|---|
| 398,176 | Germany | July 10, 1924 |